Patented June 5, 1934

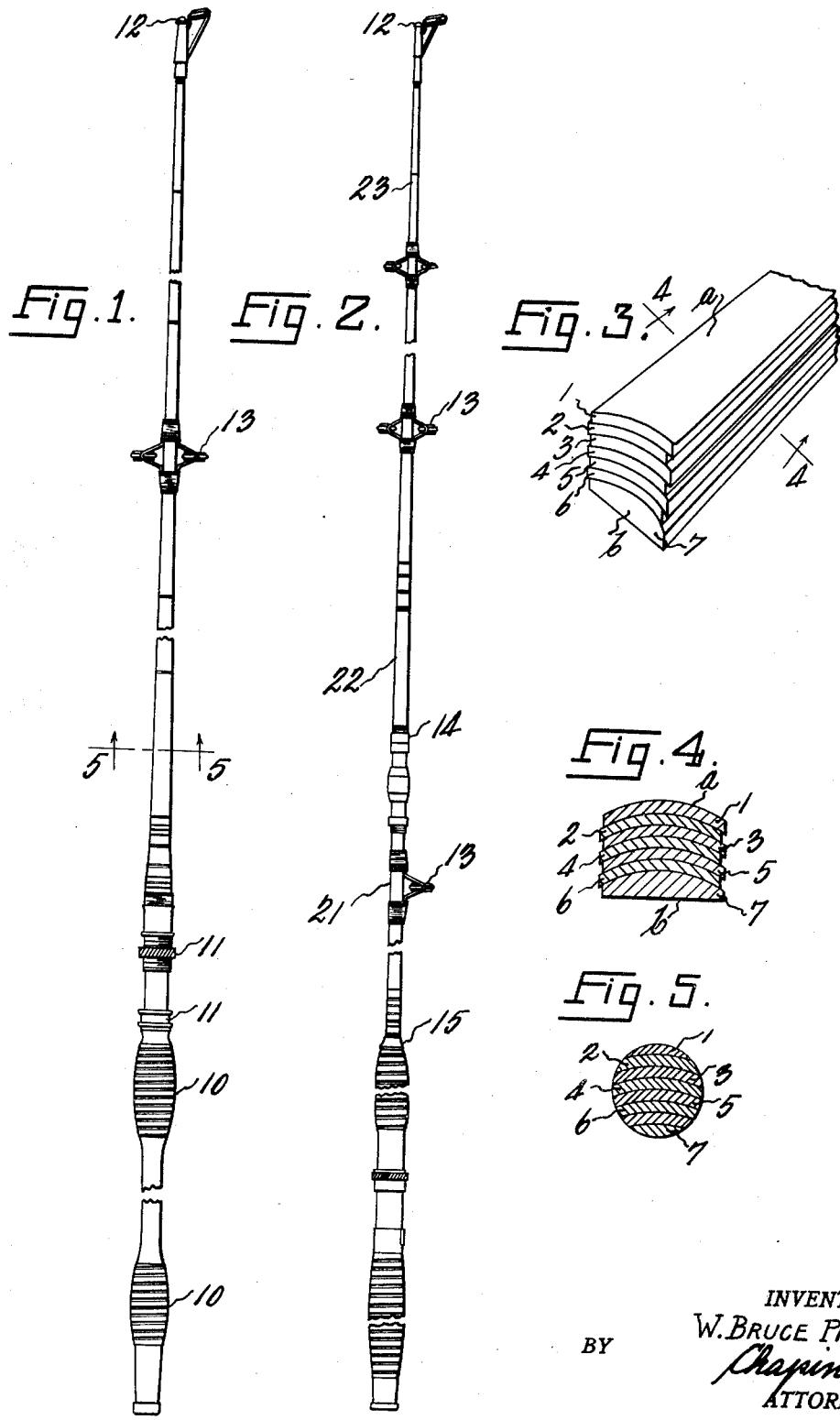

1,961,642

UNITED STATES PATENT OFFICE 1,961,642

FISHING ROD

Warren Bruce Pirnie, Greenfield, Mass., assignor to Montague Rod & Reel Company, Montague City, Mass., a corporation of Massachusetts Application May 20, 1932, Serial No. 612,418

3 Claims. (Cl. 43—18)

This invention relates to an improved fishing rod and method of making the same. It is particularly designed for fishing from boats, surf casting, and in situations where much stronger rods are desired than those used in fly casting. In surf casting it is desirable to have a very strong rod and yet one that is flexible enough to give a good "whip". In surf casting it is also desirable to have a long rod with the result that it has been difficult to make up a rod with the desired strength, flexibility, length, and one that is not too heavy for convenient use.

Rods heretofore used for this purpose have been commonly made up in a laborious and expensive manner requiring much skill, in the attempt to get all the desired qualities built into the rod. According to this invention such a rod can be built up in an inexpensive manner with the desirable characteristics present to a remarkable degree, and this is particularly true with regard to the longer types of rods which are stiff enough to stand great strains and which are also flexible enough under such strains to give the proper "whip" characteristic to the rod.

The accompanying drawing and description will make the details of the invention clear.

Fig. 1 is a plan view of a fishing rod made without joints from tip to the handle portion or butt. It has been necessary to show it in broken sections on account of the scale, but it is without joints, except where the handle portion ends;

Fig. 2 is a similar rod but made with jointed sections in the length beyond the handle portion;

Fig. 3 is a perspective view of the laminated bamboo material from which the rods are made;

Fig. 4 is a cross-section through such material after its sides and bottom have been smoothed off; and Fig. 5 is a cross-section taken on line 5—5 of Fig. 1.

To make the fishing rod, I laminate strips of split bamboo material, as shown in Fig. 3. These strips, 1 to 7 inclusive, are prepared with their pith side $b$ cut away sufficiently to nest with the enamel side of an adjacent strip to make good surface contact. The curved lines in Figs. 3 and 4 show these lines of contact. The enamel sides of the strips are roughened sufficiently to make good surfaces for gluing the strips together. They are then all glued together according to known methods so as to make a long stick or piece of substantially rectangular form. The sides of this stick are then preferably planed smooth. The curved surface $a$ (Fig. 4) is already smooth.

Then this stick is put in a lathe and turned down with the desired taper from the handle end to the tip end of the rod in the desired length. The accessories of the fishing rod, as handle portions 10, reel holder 11, tip cap 12, and guides 13 are applied in the usual manner, as indicated in Fig. 1.

The rod thus made and illustrated in Fig. 1 is for a single unbroken rod of a uniform material extending from the end of the handle portion to the tip end. This uniform material is graded in its flexibility from end to end by its taper alone and is graded transversely so as to resist bending in one direction (the direction which tends to compress the enamel sides of the bamboo laminations) more than in the reverse direction (the direction which tends to tension the enamel sides of the bamboo laminations) while the bending resistance at right angles to either of those directions above stated is equal. This arrangement gives the fisherman a choice, as he can arrange his one rod so as to bend with more or less flexibility by merely turning it in his hands. It will be noted that the laminations of the bamboo strips are arranged somewhat the same as the laminations of leaf springs. In each lamination of the bamboo strips the enamel side is much stiffer, harder, and stronger than the pith side and it makes an appreciable difference in which direction one bends the material so laminated, just as it does in bending a laminated leaf spring.

It is to be noted that the material of the rod in Fig. 1, is not made of a composite arrangement of different materials to get the different grades of bending strength and the resiliency desired in different parts of the rod. The rod gets these desired characteristics from the single bamboo material, laminated from the handle end where it begins to taper to the tip like a leaf spring arrangement.

The invention has its greatest advantages in the form of fishing rod shown in Fig. 1 without joints in the tapered portion. But fishing rods are sometimes demanded in jointed form and such a rod is shown in Fig. 2 where the joint 14 is located between the heavier portion 21 and the lighter portion 22 of the tapered part of the rod. In this arrangement the lighter portion 22 may have its laminated arrangement turned the same way or the reverse way from the heavier portion 21 and this will make a difference in the bending resistance of the rod which gives the fisherman a choice of the particular bending characteristic he wants in the single rod when he is using it.

He will get the easiest bending of the rod as he turns the pith side of the laminations toward the fish and a distinctly stiffer rod when he turns the enamel sides of the laminations toward the fish. In the rod of Fig. 1 the laminations from the handle end to the tip end will act the same, with a given side toward the fish, because there are no joints above the handle. This is of considerable importance in very long rods where great strength is desired with a large degree of flexibility as well as a strong "whip" characteristic. In the rod of Fig. 2 the sections 21 and 22 may be reversed (with respect to their respective laminations) by simply turning one section in the other 180°. In boat fishing where shorter rods, for example than are used in surf casting, are desired, it is possible to have the same rod change from a fairly stiff rod to one in which the tip end section has a greater degree of flexibility.

I claim:

1. A fishing rod made of laminated bamboo strips, the enamel side of one strip being glued to the pith side of its adjacent strip throughout the rod to make a solid construction from one end to the other, said rod having a greater resistance to bending in that direction toward which the enamel sides of the strip face.

2. A fishing rod made up of jointed sections, each section of which is made of laminated bamboo strips, the enamel side of one strip being glued to the pith side of its adjacent strip to make a solid body having a greater resistance to bending in the direction toward the enamel side than toward the pith side of the strips, whereby the bending characteristics of the rod can be altered by turning the separable jointed sections with respect to each other for the desired effect.

3. A fishing rod made with a solid cross-section of uniform layers of curved bamboo strips glued together with the pith side of one strip attached to the weather side of each adjacent strip and with the laminations tapered towards the tip end of the rod from the handle portion, the flexibility of the rod depending on the characteristics of such bamboo material arranged in laminated form like a leaf spring whereby the bending resistance and resiliency of the rod will depend to a marked degree on whether it is worked with the pith sides or the weather sides of the bamboo laminations facing toward the fish.

W. BRUCE PIRNIE.